H. SILVER.
HOLDER FOR CAKES OF SOAP.
APPLICATION FILED APR. 7, 1919.
1,333,941. Patented Mar. 16, 1920.
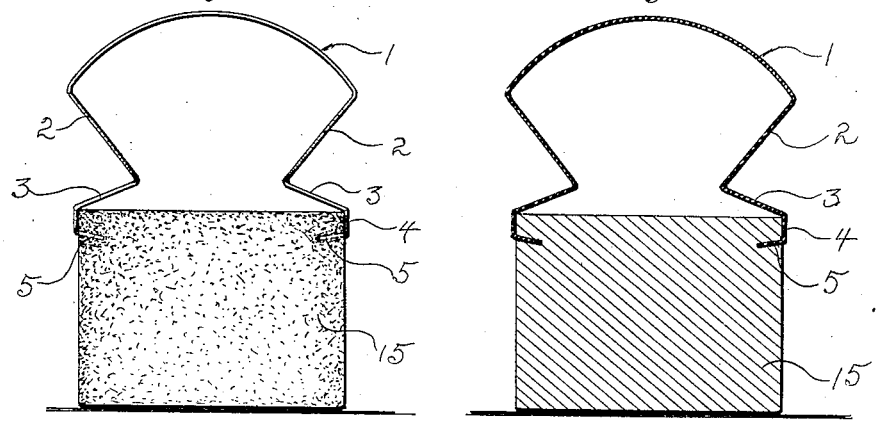
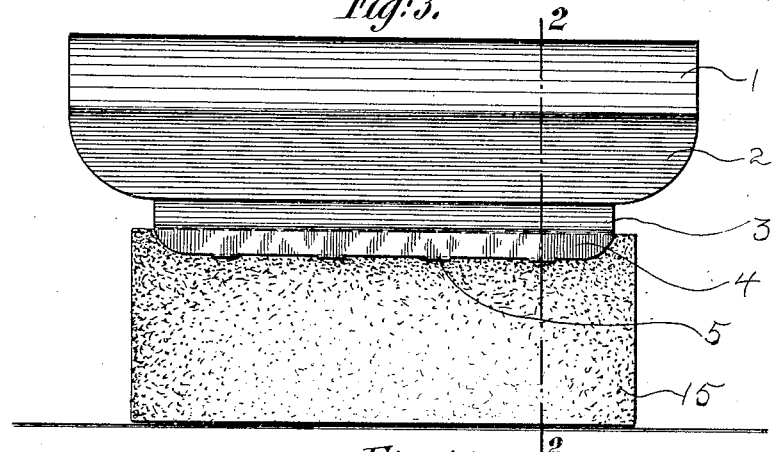
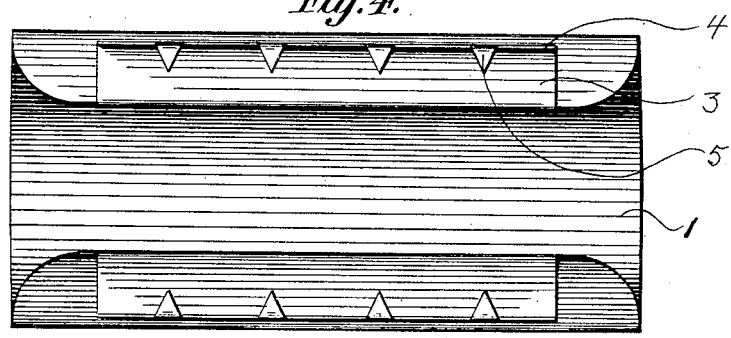
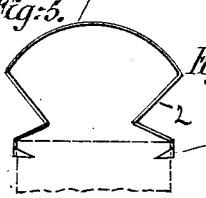
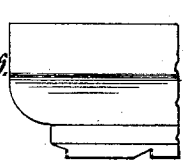
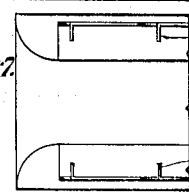
INVENTOR
Herman Silver
BY Moclet Blun
ATTORNEYS.

UNITED STATES PATENT OFFICE.

HERMAN SILVER, OF BROOKLYN, NEW YORK.

HOLDER FOR CAKES OF SOAP.

1,333,941.  Specification of Letters Patent.  Patented Mar. 16, 1920.

Application filed April 7, 1919. Serial No. 287,997.

*To all whom it may concern:*

Be it known that I, HERMAN SILVER, a citizen of Poland, residing at 164 Hewes street, borough of Brooklyn, in the county of Kings and State of New York, have invented certain new and useful Improvements in Holders for Cakes of Soap, of which the following is a specification.

This invention relates to a cheap, reliable and convenient holder for a cake of soap, such as is generally used for scrubbing floors, or any other household work, and it pertains more particularly to that class of holders of this general character embodying a piece of resilient sheet metal with depending portions or jaws provided with means for embedment in the soap.

Heretofore it has been proposed to construct a device of this general character of a resilient sheet metal shell substantially U-shaped in cross section, with an upper grip and a pair of depending jaws integral therewith, there being fitted within the upper grip a rigid reinforcing block held to the shell by means of brads or the like, the block having depending therefrom blades adapted to embed themselves in the upper side of the cake of soap, and the jaws provided with inwardly directed blades adapted to enter the sides of the cake of soap. By this construction the proper amount of resiliency is not obtained and the depending jaws or skirt portions are not forced with sufficient strength toward each other so that such skirt portions shall contact with the opposite sides of the cake of soap and firmly clutch it.

By my present invention I aim to overcome such objection and to produce a holder which shall be resilient throughout its entire surface or area and in which the tendency is to insure the greatest amount of resiliency so that the skirt portions will be at all times held firmly against the opposite sides of the cake of soap and the latter will more securely hold.

The invention is clearly illustrated in the accompanying drawings, which, with the numerals of reference marked thereon, form a part of this specification, and in which—

Figure 1 is an end view.

Fig. 2 is a vertical section.

Fig. 3 is a side view.

Fig. 4 is a bottom view of the holder alone.

Fig. 5 is a sectional view of another form of holder showing a cake of soap in dotted lines, giving a detailed view of a particular form of prong employed.

Fig. 6 is a side elevation of the modification of holder shown in Fig. 5.

Fig. 7 is a bottom plan view of the same form of holder.

The holder is preferably stamped out of springy metal and has an arched top 1, inwardly inclined limbs 2, outwardly inclined limbs 3, and skirt portions 4, having inwardly bent teeth 5, which are adapted to enter the cake of soft soap 15.

The holder is resilient throughout its surface and by reason of the outwardly inclined limbs 3, together with the inwardly inclined limbs 2 being free and unobstructed and the skirt portions 4 intermediate the limbs 3 and the inwardly bent teeth 5, and these latter being at the terminals of the members 4 and inclined oppositely to the inclines of the members 3, the device when once applied to the cake of soap is firmly held in position, the parts coöperating to firmly grasp the cake of soap, as will be clearly understood upon reference to Figs. 1 and 2.

Because of this configuration the holder can be spread apart, and slipped over a cake of soap, and then when the limbs 2 and 3 spring toward each other, the cake of soap is tightly clamped between the skirt portions 4, and it is also gripped by the teeth 5.

The holder can now be conveniently held in the hand and the cake of soap can then be used in the ordinary way.

Since the cake of soap is tightly clamped between the skirt portions 4 any crumbling or cracking thereof is prevented when the cake of soap wears down.

As a result, the cake of soap can be readily used until it has worn down to the height of the teeth 5.

When this has occurred the holder can be readily detached and applied to another cake of soap.

The teeth 5 are triangular in shape and are downwardly inclined, as shown in Fig. 2. Hence when these teeth are forced into the cake of soap, the skirt portions are forced downwardly so that the line of demarcation between the skirt portion 4 and the limbs 3, corresponds with the upper surface of the soap.

The modified form of holder shown in Figs. 5, 6 and 7 shows prongs stamped out from and bent away from the skirt portions and entering the cake of soap. Otherwise the construction shown is the same as in the previous figures.

I have described a preferred embodiment of my invention but it is obvious that numerous changes and omissions could be made in its details without departing from its spirit.

It is obvious that another advantage of this holder is that it prevents the contact of the hand with any nails, pieces of glass, pins, or other articles.

I claim:

As an improved article of manufacture, a soap holder made of resilient material and comprising the arched top, inwardly inclined limbs extending from opposite sides of said arched top, outwardly inclined limbs diverging from the ends of said inwardly inclined limbs, skirt portions substantially parallel to each other and depending from the ends of said outwardly inclined limbs, and teeth projecting from said skirt portions and inclined inwardly and downwardly, the material of said holder being unrestricted throughout as to resiliency with the angles between the skirt portions and the outwardly inclined portions contacting with the opposite top edges of a cake of soap and the resiliency being sufficient to force the teeth into the soap so that the latter is gripped with said skirt portions in close contact with the soap and held by such resiliency.

In testimony whereof I hereunto affix my signature.

HERMAN SILVER.